US008497330B2

(12) United States Patent
Hussein et al.

(10) Patent No.: US 8,497,330 B2
(45) Date of Patent: Jul. 30, 2013

(54) METHODS FOR POLYMERIZATION USING SPRAY DRIED AND SLURRIED CATALYST

(75) Inventors: F. David Hussein, Cross Lanes, WV (US); Kevin J. Cann, Rocky Hill, NJ (US); Ann M. Schoeb-Wolters, Lebanon, NJ (US); Phuong A. Cao, Old Bridge, NJ (US); Bruce J. Savatsky, Kingwood, TX (US); Eric J. Markel, Kingwood, TX (US); Daniel P. Zilker, Jr., Charleston, WV (US); Garth R. Giesbrecht, The Woodlands, TX (US)

(73) Assignee: Univation Technologies, LLC, Houston, TX (US)

( * ) Notice: Subject to any disclaimer, the term of this patent is extended or adjusted under 35 U.S.C. 154(b) by 301 days.

(21) Appl. No.: 12/976,059

(22) Filed: Dec. 22, 2010

(65) Prior Publication Data
US 2011/0130531 A1 Jun. 2, 2011

Related U.S. Application Data

(60) Continuation-in-part of application No. 11/820,408, filed on Jun. 19, 2007, now abandoned, which is a continuation of application No. 11/168,112, filed on Jun. 28, 2005, now abandoned, and a continuation-in-part of application No. 10/883,551, filed on Jul. 1, 2004, now Pat. No. 7,381,783, and a continuation-in-part of application No. 10/696,680, filed on Oct. 29, 2003, now abandoned, which is a division of application No. 09/808,609, filed on Mar. 14, 2001, which is a division of application No. 09/207,213, filed on Dec. 8, 1998, now Pat. No. 6,248,845, which is a continuation-in-part of application No. 08/986,696, filed on Dec. 8, 1997, now Pat. No. 6,242,545.

(51) Int. Cl.
*C08F 4/64* (2006.01)
*C08F 4/76* (2006.01)
*C08F 4/52* (2006.01)
*C08F 2/34* (2006.01)

(52) U.S. Cl.
USPC ........... 526/160; 526/170; 526/136; 526/127; 526/129; 526/151; 526/148; 526/141; 526/142; 526/941; 526/943; 526/74; 526/901

(58) Field of Classification Search
USPC ................. 526/160, 170, 135, 142, 141, 147, 526/74, 901
See application file for complete search history.

(56) References Cited

U.S. PATENT DOCUMENTS

| | | | |
|---|---|---|---|
| 4,405,495 A | 9/1983 | Lee et al. | |
| 4,704,491 A | 11/1987 | Tsutsui et al. | |
| 4,894,424 A | 1/1990 | Lassalle | |
| 4,914,253 A | 4/1990 | Chang | |
| 4,927,797 A | 5/1990 | Ewen | |
| 4,931,417 A | 6/1990 | Miya et al. | |
| 5,001,205 A | 3/1991 | Hoel | |
| 5,017,714 A | 5/1991 | Welborn | |
| 5,026,797 A | 6/1991 | Takahashi | |
| 5,055,438 A | 10/1991 | Canich | |
| 5,084,534 A | 1/1992 | Welborn et al. | |
| 5,086,134 A | 2/1992 | Antberg et al. | |
| 5,096,867 A | 3/1992 | Canich | |
| 5,198,401 A | 3/1993 | Turner et al. | |
| 5,218,071 A | 6/1993 | Tsutsui et al. | |
| 5,229,478 A | 7/1993 | Floyd et al. | |
| 5,258,475 A | 11/1993 | Kissin | |
| 5,264,405 A | 11/1993 | Canich | |
| 5,278,119 A | 1/1994 | Turner et al. | |
| 5,281,679 A | 1/1994 | Jejelowo et al. | |
| 5,283,278 A * | 2/1994 | Daire et al. ................... | 524/399 |
| 5,290,745 A | 3/1994 | Jorgensen et al. | |
| 5,324,800 A | 6/1994 | Welborn et al. | |
| 5,332,706 A | 7/1994 | Nowlin et al. | |
| 5,376,439 A | 12/1994 | Hodgson et al. | |
| 5,384,299 A | 1/1995 | Turner et al. | |
| 5,387,660 A | 2/1995 | Doyle et al. | |
| 5,408,017 A | 4/1995 | Turner et al. | |
| 5,416,228 A | 5/1995 | Ewen et al. | |
| 5,491,207 A | 2/1996 | Hoel | |
| 5,523,435 A | 6/1996 | Lisowsky | |
| 5,525,689 A | 6/1996 | Tsutsui et al. | |

(Continued)

FOREIGN PATENT DOCUMENTS

EP 0413326 A2 2/1991
EP 0420436 A1 4/1991

(Continued)

OTHER PUBLICATIONS

Abstract—JP 01-319489.
Abstract—JP 07-252267.
Abstract—JP 07-252287.
Abstract—JP 07-330820.
Abstract—JP 09-176400.
Hawley's Condensed Chemical Dictionary, 13th Edition, John Wiley & Sons, p. 34, 1997.
Heiland, Kirstin and Kaminsky, Walter "Comparison of zirconocene and hafnocene catalysts for the polymerization of ethylene and 1-butene" Makromol. Chem., vol. 193, pp. 601-610 (1992).
Makela-Vaarne, N. I. et al., "Supported metallocene catalysts—interactions $(n\text{-BuCp})_2\text{HfCl}_2$ with methylaluminoxane and silica," Journal of Molecular Catalysis A: Chemical (2003) pp. 323-332.
Tian, Jun and Huang, Baotong, "Ethylene polymerization with catalyst systems based on metallocenes with varying steric hindrance and methylaluminoxane" Macromol. Rapid Commun., 15, 923-928 (1994).
Usami, Takao et al., "Generation Mechanism of Short-Chain Branching Distribution in Linear Low-Density Polyethylenes" Macromolecules, vol. 19, pp. 2722-2726 (1986).

(Continued)

Primary Examiner — Rip A. Lee
(74) Attorney, Agent, or Firm — Jennifer A. Schmidt; Kristina Leavitt

(57) ABSTRACT

Methods for gas phase olefin polymerization are provided. The method can include combining a spray dried catalyst system with a diluent to produce a catalyst slurry. The catalyst system can include a metallocene compound. Ethylene, a continuity additive, and the catalyst slurry can be introduced to a gas phase fluidized bed reactor. The reactor can be operated at conditions sufficient to produce a polyethylene. The spray dried catalyst system can have a catalyst productivity of at least 12,000 grams polyethylene per gram of the catalyst system.

16 Claims, No Drawings

U.S. PATENT DOCUMENTS

| | | | |
|---|---|---|---|
| 5,541,272 | A | 7/1996 | Schmid et al. |
| 5,550,094 | A | 8/1996 | Ali et al. |
| 5,602,067 | A | 2/1997 | Nowlin et al. |
| 5,608,019 | A | 3/1997 | Cheruvu et al. |
| 5,621,054 | A | 4/1997 | Harrington |
| 5,621,126 | A | 4/1997 | Canich et al. |
| 5,648,310 | A | 7/1997 | Wasserman et al. |
| 5,672,669 | A * | 9/1997 | Wasserman et al. .......... 526/170 |
| 5,674,795 | A | 10/1997 | Wasserman et al. |
| 5,688,735 | A | 11/1997 | Ewen et al. |
| 5,714,426 | A | 2/1998 | Tsutsui et al. |
| 5,763,543 | A | 6/1998 | Muhle et al. |
| 5,767,208 | A | 6/1998 | Turner et al. |
| 5,789,332 | A | 8/1998 | Kutschera et al. |
| 6,117,955 | A * | 9/2000 | Agapiou et al. ............. 526/141 |
| 6,124,229 | A | 9/2000 | Becker et al. |
| 6,147,172 | A | 11/2000 | Brown et al. |
| 6,234,950 | B1 | 5/2001 | von Haken Spence et al. |
| 6,235,671 | B1 | 5/2001 | McKay et al. |
| 6,235,672 | B1 | 5/2001 | McKay et al. |
| 6,239,061 | B1 | 5/2001 | Wang et al. |
| 6,239,238 | B1 | 5/2001 | Brown et al. |
| 6,242,545 | B1 | 6/2001 | Jejelowo et al. |
| 6,245,868 | B1 * | 6/2001 | Agapiou et al. ............... 526/88 |
| 6,248,845 | B1 * | 6/2001 | Loveday et al. ............. 526/113 |
| 6,281,306 | B1 | 8/2001 | Oskam et al. |
| 6,300,436 | B1 * | 10/2001 | Agapiou et al. ............. 526/154 |
| 6,355,744 | B1 | 3/2002 | von Haken Spence et al. |
| 6,433,203 | B1 | 8/2002 | Dall'occo et al. |
| 6,486,273 | B1 | 11/2002 | McKay et al. |
| 6,528,597 | B2 | 3/2003 | Loveday et al. |
| 6,579,998 | B2 | 6/2003 | Sita et al. |
| 6,608,153 | B2 * | 8/2003 | Agapiou et al. ............. 526/154 |
| 6,649,558 | B2 | 11/2003 | Brown et al. |
| 6,656,866 | B2 | 12/2003 | Wenzel et al. |
| 6,656,868 | B2 | 12/2003 | Oskam et al. |
| 6,660,815 | B2 | 12/2003 | Agapiou et al. |
| 6,800,704 | B2 | 10/2004 | Floyd et al. |
| 7,381,783 | B2 | 6/2008 | Loveday et al. |
| RE40,751 | E | 6/2009 | Jejelowo et al. |
| 7,989,564 | B2 * | 8/2011 | Loveday et al. ............. 526/160 |
| 2001/0020074 | A1 | 9/2001 | Jejelowo et al. |
| 2004/0097365 | A1 | 5/2004 | Loveday et al. |
| 2006/0293470 | A1 | 12/2006 | Cao et al. |
| 2007/0276106 | A1 | 11/2007 | Cao et al. |
| 2008/0108768 | A1 | 5/2008 | Loveday et al. |
| 2008/0214753 | A1 | 9/2008 | Loveday et al. |

FOREIGN PATENT DOCUMENTS

| | | |
|---|---|---|
| EP | 0443686 A2 | 8/1991 |
| EP | 0481480 A1 | 4/1992 |
| EP | 0495099 A1 | 7/1992 |
| EP | 0596553 A2 | 5/1994 |
| EP | 0612768 A1 | 8/1994 |
| EP | 0284707 B1 | 8/1995 |
| EP | 0669346 A1 | 8/1995 |
| EP | 0316155 | 2/1996 |
| EP | 0773239 A2 | 5/1997 |
| EP | 0781789 A2 | 7/1997 |
| EP | 0668295 B1 | 6/1998 |
| EP | 0515132 | 8/1998 |
| EP | 0735059 | 10/2001 |
| JP | 2001-525457 | 12/2001 |
| JP | 09-504563 | 2/2009 |
| WO | WO 91/03505 | 3/1991 |
| WO | WO 94/03509 | 2/1994 |
| WO | WO 94/17112 | 8/1994 |
| WO | WO 95/04761 | 2/1995 |
| WO | WO 95/11263 | 4/1995 |
| WO | WO 97/03080 | 1/1997 |
| WO | WO 97/22635 | 6/1997 |
| WO | WO 98/02470 | 1/1998 |
| WO | WO 02/46250 | 6/2002 |

* cited by examiner

METHODS FOR POLYMERIZATION USING SPRAY DRIED AND SLURRIED CATALYST

CROSS REFERENCE TO RELATED APPLICATIONS

This application is a continuation in part of U.S. patent application Ser. No. 11/820,408, filed on Jun. 19, 2007, now abandoned, said application which is: (i) a continuation of U.S. patent application Ser. No. 11/168,112, filed on Jun. 28, 2005, now abandoned; and (ii) a continuation-in-part of U.S. patent application Ser. No. 10/883,551, filed on Jul. 1, 2004, now U.S. Pat. No. 7,381,783, which is a continuation of U.S. patent application Ser. No. 10/696,680, filed Oct. 29, 2003, now abandoned, which is a divisional of Ser. No. 09/808,609, filed on Mar. 14, 2001, now abandoned, which is a divisional of U.S. patent application Ser. No. 09/207,213, filed on Dec. 8, 1998, now U.S. Pat. No. 6,248,845, which is a continuation-in-part of U.S. patent application Ser. No. 08/986,696, filed on Dec. 8, 1997, issued as U.S. Pat. No. 6,242,545, which then re-issued as U.S. Pat. No. RE40751, the disclosures of which are incorporated herein by reference.

BACKGROUND

Single site catalyst systems, such as metallocene catalyst systems, have been used for gas phase polymerization of olefins to produce polymers having properties useful for a wide variety of applications. The catalyst productivity for metallocene catalysts systems, i.e. the amount of polymer produced per gram of the metallocene catalyst system, however, remains less than optimal. Further, metallocene catalyst systems in gas phase fluidized bed reactors have a tendency to cause polymer build-up, i.e. fouling, which is usually referred to as agglomeration, chunking, and/or sheeting of the polymer within the reactor. As such, the polymerization of olefins in gas phase fluidized bed reactors is frequently hindered because the reactor must be shutdown for cleaning and removal of the polymer build-up.

There is a need, therefore, for improved methods for the gas phase polymerization of olefins using metallocene catalyst systems having increased catalyst productivity. There is also a need for improved methods for the gas phase polymerization of olefins using metallocene catalyst systems having a reduced tendency for fouling.

SUMMARY

Disclosed is a method for gas phase olefin polymerization that can include combining a spray dried catalyst system with a diluent to produce a catalyst slurry. The catalyst system can include a metallocene compound. Ethylene, a continuity additive, and the catalyst slurry can be introduced to a gas phase fluidized bed reactor. The reactor can be operated at conditions sufficient to produce a polyethylene. The spray dried catalyst system can have a catalyst productivity of at least 12,000 grams polyethylene per gram of the catalyst system.

Another method for gas phase olefin polymerization can include combining a metallocene catalyst compound, an activator, a filler material, and a first diluent to produce a suspension. The suspension can be spray dried to produce a spray dried catalyst system. The spray dried catalyst system can be combined with a second diluent to produce a catalyst slurry. Ethylene, a continuity additive, and the catalyst slurry can be introduced to a gas phase fluidized bed reactor. The reactor can be operated at conditions sufficient to produce a polyethylene, wherein the spray dried catalyst system has a catalyst productivity of at least 14,000 grams polyethylene per gram of the catalyst system.

DETAILED DESCRIPTION

It has been surprisingly and unexpectedly discovered that a high level of catalyst activity is obtained when a spray dried catalyst system is introduced to a gas phase fluidized bed reactor as a slurry. It has also been surprisingly and unexpectedly discovered that using the catalyst slurry and continuity additive in conjunction with one another can produce a polymer product with little to no generation of fouling, e.g., agglomerates, rubble, chunks, and/or sheets, within the reactor.

Catalyst Compounds

The catalyst system can include one or more single-site catalysts such as metallocenes, chromium-based catalysts, Ziegler-Natta catalysts, transition metal catalyst or Group 15-containing metal compounds, and/or bimetallic catalysts. The catalyst system can also include one or more of $AlCl_3$, cobalt, iron, palladium, chromium/chromium oxide or "Phillips" catalysts. Any catalyst or combination of catalysts can be used alone or in combination with the others, i.e. a "mixed" catalyst. Preferably, the catalyst system includes at least one metallocene or metallocene compound.

Metallocene compounds are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and in particular, for use in the synthesis of polyethylene in 1 METALLOCENE-BASED POLYOLEFINS 261-377 (2000). The metallocene compounds can include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, and, in a particular example, the atoms that make up the Cp ligands are selected from the group consisting of carbon, nitrogen, oxygen, silicon, sulfur, phosphorous, germanium, boron, aluminum, and combinations thereof, where carbon makes up at least 50% of the ring members. In another example, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$ Ind"), substituted versions thereof (as discussed and described in more detail below), and heterocyclic versions thereof.

The metal atom "M" of the metallocene compound can be selected from the group consisting of Groups 3 through 12 atoms and lanthanide Group atoms in one example; and selected from the group consisting of Groups 3 through 10 atoms in another example, and selected from the group consisting of Sc, Ti, Zr, Hf, V, Nb, Ta, Mn, Re, Fe, Ru, Os, Co, Rh, Ir, and Ni in yet another example; and selected from the group consisting of Groups 4, 5, and 6 atoms in yet another example, and Ti, Zr, Hf atoms in yet another example, and Hf in yet a more particular example. The oxidation state of the metal atom "M" can range from 0 to +7 in one example; and in a more particular example, can be +1, +2, +3, +4 or +5; and in yet a more particular example can be +2, +3 or +4. The groups bound to the metal atom "M" are such that the compounds described below in the formulas and structures are electrically neutral, unless otherwise indicated. The Cp ligand(s) forms at least one chemical bond with the metal atom M to form the "metallocene catalyst compound." The Cp ligands are distinct from the leaving groups bound to the catalyst compound in that they are not highly susceptible to substitution/abstraction reactions.

The one or more metallocene compounds can be represented by the formula (I):

$$Cp^A Cp^B MX_n \quad (I)$$

where M is as described above; each X is chemically bonded to M; each Cp group is chemically bonded to M; and n is 0 or an integer from 1 to 4, and either 1 or 2 in a particular example.

The ligands represented by $Cp^A$ and $Cp^B$ in formula (I) can be the same or different cyclopentadienyl ligands or ligands isolobal to cyclopentadienyl, either or both of which can contain heteroatoms and either or both of which can be substituted by a group R. In another example $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) can be unsubstituted or substituted with any one or combination of substituent groups R. Non-limiting examples of substituent groups R as used in structure (I) as well as ring substituents in structures Va-d, discussed and described below, include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents R associated with formulas (I) through (Va-d) include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like. Other possible radicals include substituted alkyls and aryls such as, for example, fluoromethyl, fluroethyl, difluoroethyl, iodopropyl, bromohexyl, chlorobenzyl, hydrocarbyl substituted organometalloid radicals including trimethylsilyl, trimethylgermyl, methyldiethylsilyl, and the like, and halocarbyl-substituted organometalloid radicals, including tris (trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, as well as Group 16 radicals including methoxy, ethoxy, propoxy, phenoxy, methylsulfide and ethylsulfide.

Other substituent groups R include, but are not limited to, olefins such as olefinically unsaturated substituents including vinyl-terminated ligands such as, for example, 3-butenyl, 2-propenyl, 5-hexenyl and the like. In one example, at least two R groups (two adjacent R groups in another example) are joined to form a ring structure having from 3 to 30 atoms selected from the group consisting of carbon, nitrogen, oxygen, phosphorous, silicon, germanium, aluminum, boron and combinations thereof. Also, a substituent group R such as 1-butanyl can form a bonding association to the element M.

Each X in the formula (I) above and for the formula/structures (II) through (Va-d) below is independently selected from the group consisting of: any leaving group, in one example; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_8$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a more particular example; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular example; hydride, chloride, fluoride, methyl, phenyl, phenoxy, benzoxy, tosyl, fluoromethyls and fluorophenyls in yet a more particular example; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls in yet a more particular example; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular example; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular example; and fluoride in yet a more particular example.

Other non-limiting examples of X groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides, halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methoxy, ethyoxy, propoxy, phenoxy, bis (N-methylanilide), dimethylamide, dimethylphosphide radicals and the like. In one example, two or more X's form a part of a fused ring or ring system. In at least one example, X can be a leaving group selected from the group consisting of chloride ions, bromide ions, $C_1$ to $C_{10}$ alkyls, and $C_2$ to $C_{12}$ alkenyls, carboxylates, acetylacetonates, and alkoxides.

The metallocene compound can include those of formula (I) where $Cp^A$ and $Cp^B$ are bridged to each other by at least one bridging group, (A), such that the structure is represented by formula (II):

$$Cp^A(A)Cp^B MX_n \quad (II)$$

These bridged compounds represented by formula (II) are known as "bridged metallocenes." The elements $Cp^A$, $Cp^B$, M, X and n in structure (II) are as defined above for formula (I); where each Cp ligand is chemically bonded to M, and (A)

is chemically bonded to each Cp. The bridging group (A) can include divalent hydrocarbon groups containing at least one Group 13 to 16 atom, such as, but not limited to, at least one of a carbon, oxygen, nitrogen, silicon, aluminum, boron, germanium, tin atom, and combinations thereof; where the heteroatom can also be $C_1$ to $C_{12}$ alkyl or aryl substituted to satisfy neutral valency. In another example, the bridging group (A) can also include substituent groups R as defined above (for formula (I)) including halogen radicals and iron. In another example, the bridging group (A) can be represented by $C_1$ to $C_6$ alkylenes, substituted $C_1$ to $C_6$ alkylenes, oxygen, sulfur, $R'_2C=$, $R'_2Si=$, $=Si(R')_2Si(R'_2)=$, $R'_2Ge=$, and $R'P=$, where "=" represents two chemical bonds, R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and where two or more R' can be joined to form a ring or ring system. In another example, the bridged metallocene compound of formula (II) includes two or more bridging groups (A). In one example, (A) can be a divalent bridging group bound to both $Cp^A$ and $Cp^B$ selected from the group consisting of divalent $C_1$ to $C_{20}$ hydrocarbyls and $C_1$ to $C_{20}$ heteroatom containing hydrocarbonyls, where the heteroatom containing hydrocarbonyls comprise from one to three heteroatoms.

The bridging group (A) can include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties where the Si atom is replaced by a Ge or a C atom; as well as dimethylsilyl, diethylsilyl, dimethylgermyl and diethylgermyl.

The bridging group (A) can also be cyclic, having, for example, 4 to 10 ring members; in a more particular example, bridging group (A) can have 5 to 7 ring members. The ring members can be selected from the elements mentioned above, and, in a particular example, can be selected from one or more of B, C, Si, Ge, N and O. Non-limiting examples of ring structures which can be present as, or as part of, the bridging moiety are cyclobutylidene, cyclopentylidene, cyclohexylidene, cycloheptylidene, cyclooctylidene and the corresponding rings where one or two carbon atoms are replaced by at least one of Si, Ge, N and O. In another example, one or two carbon atoms can be replaced by at least one of Si and Ge. The bonding arrangement between the ring and the Cp groups can be either cis-, trans-, or a combination thereof.

The cyclic bridging groups (A) can be saturated or unsaturated and/or can carry one or more substituents and/or can be fused to one or more other ring structures. If present, the one or more substituents can be selected from the group consisting of hydrocarbyl (e.g., alkyl, such as methyl) and halogen (e.g., F, Cl). The one or more Cp groups to which the above cyclic bridging moieties can optionally be fused can be saturated or unsaturated, and are selected from the group consisting of those having 4 to 10, more particularly 5, 6, or 7 ring members (selected from the group consisting of C, N, O, and S in a particular example) such as, for example, cyclopentyl, cyclohexyl and phenyl. Moreover, these ring structures can themselves be fused such as, for example, in the case of a naphthyl group. Moreover, these (optionally fused) ring structures can carry one or more substituents. Illustrative, non-limiting examples of these substituents are hydrocarbyl (particularly alkyl) groups and halogen atoms.

The ligands $Cp^A$ and $Cp^B$ of formula (I) and (II) can be different from each other. The ligands $Cp^A$ and $Cp^B$ of formula (I) and (II) can be the same.

The metallocene compound can include bridged monoligand metallocene compounds (e.g., mono cyclopentadienyl catalyst components). In this example, the at least one metallocene catalyst compound can be a bridged "half-sandwich" metallocene represented by the formula (III):

$$Cp^A(A)QMX_r \quad (III)$$

where $Cp^A$ is as defined above for formula (I) and is bound to M; (A) is a bridging group bonded to Q and $Cp^A$; and an atom from the Q group is bonded to M; and r is an integer 0, 1 or 2.

In formula (III), $Cp^A$, (A) and Q can form a fused ring system. The X groups of formula (III) are as defined above in formulas (I) and (II). In another example, $Cp^A$ is selected from the group consisting of cyclopentadienyl, indenyl, tetrahydroindenyl, fluorenyl, substituted versions thereof, and combinations thereof.

Q, in formula (III), can be a heteroatom-containing ligand in which the bonding atom (the atom that is bonded with the metal M) is selected from the group consisting of Group 15 atoms and Group 16 atoms. The bonding atom can be selected from the group consisting of nitrogen, phosphorus, oxygen, or sulfur atoms. The bonding atom can be selected from the group consisting of nitrogen and oxygen. Illustrative Q groups can include, but are not limited to, alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene other compounds having Group 15 and Group 16 atoms capable of bonding with M.

The metallocene compound can be an unbridged "half sandwich" metallocene represented by the formula (IVa):

$$Cp^AMQ_qX_w \quad (IVa)$$

where $Cp^A$ is as defined above for the Cp groups in formula (I) and is a ligand that is bonded to M; each Q is independently bonded to M; X is a leaving group as described above in formula (I); w ranges from 0 to 3, and is 0 or 3 in one example; and q ranges from 0 to 3, and is 0 or 3 in at least one example.

$Cp^A$ can be selected from the group consisting of cyclopentadienyl, indenyl, tetrahydroindenyl, fluorenyl, substituted version thereof, and combinations thereof. In formula (IVa), Q is selected from the group consisting of $ROO^-$, $RO-$, $R(O)-$, $-NR-$, $-CR_2-$, $-S-$, $-NR_2$, $-CR_3$, $-SR$, $-SiR_3$, $-PR_2$, $-H$, and substituted and unsubstituted aryl groups, R is selected from the group consisting of $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (IVb), such as described in, for example, U.S. Pat. No. 6,069,213:

$$Cp^AM(W_2GZ)X_y \text{ or}$$

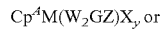

$$\text{(IVb)} \quad T(Cp^AM(W_2GZ)X_y)_m$$

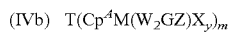

where M, $Cp^A$, and X are as defined above; $W_2GZ$ forms a polydentate ligand unit (e.g., pivalate), where at least one of the W groups form a bond with M, and is defined such that each W is independently selected from the group consisting of —O—, —NR—, —$CR_2$— and —S—; G is either carbon or silicon; and Z is selected from the group consisting of R, —OR, —$NR_2$, —$CR_3$, —SR, —$SiR_3$, —$PR_2$, and hydride, providing that when W is —NR—, then Z is selected from the group consisting of —OR, —$NR_2$, —SR, —$SiR_3$, —$PR_2$; and provided that neutral valency for W is satisfied by Z; and where each R is independently selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys; y is 1 or 2 in a particular example; T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; where each T group bridges adjacent "$Cp^A M(W_2GZ)X_y$" groups, and is chemically bonded to the $Cp^A$ groups; and m is an integer from 1 to 7. In one example, m is an integer from 2 to 6.

The metallocene compound can be described more particularly with formulas (Va), (Vb), (Vc) and (Vd):

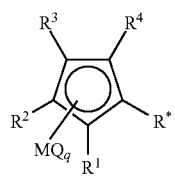

(Va-i)

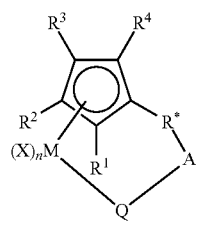

(Va-ii)

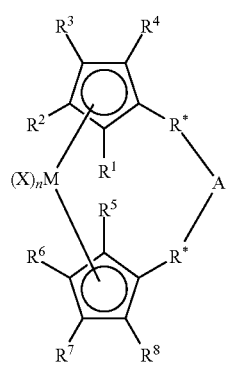

(Vb)

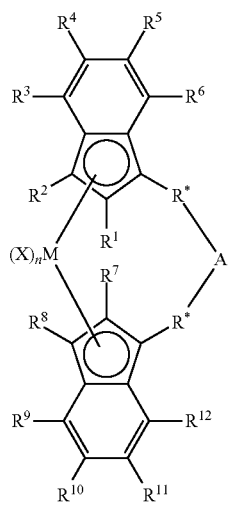

(Vc)

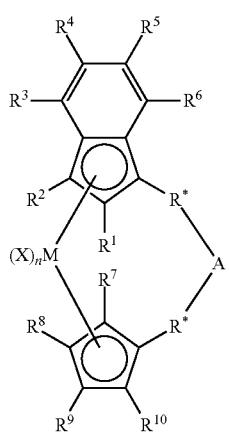

(Vd)

where in structures (Va) to (Vd) M is selected from the group consisting of Group 3 to Group 12 atoms, and selected from the group consisting of Group 3 to Group 10 atoms in a more particular example, and selected from the group consisting of Group 3 to Group 6 atoms in yet a another example, and selected from the group consisting of Group 4 atoms in yet another example, and selected from the group consisting of Zr and Hf in yet another example; and is Hf in yet another example; Q in (Va-i) and (Va-ii) is selected from the group consisting of halogen ions, alkyls, alkylenes, aryls, arylenes, alkoxys, aryloxys, amines, alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates; q is an integer ranging from 1 to 3; each R* is independently selected from the group consisting of hydrocarbyls and heteroatom-containing hydrocarbyls in one example; and selected from the group consisting of alkylenes, substituted alkylenes and heteroatom-containing hydrocarbyls in another example; and selected from the group consisting of $C_1$ to $C_{12}$ alkylenes, $C_1$ to $C_{12}$ substituted alkylenes, and $C_1$ to $C_{12}$ heteroatom-containing hydrocarbons in another example; and selected from the group consisting of $C_1$ to $C_4$ alkylenes in yet another example; and where both R* groups are identical in another example in structures (Vb-d); A is as described above for (A) in structure (II), and more particularly, selected from the group consisting of —O—, —S—, —SO$_2$—, —NR—, =SiR$_2$, =GeR$_2$, =SnR$_2$, —R$_2$SiSiR$_2$—, RP=, C$_1$ to C$_{12}$ alkylenes, substituted C$_1$ to C$_{12}$ alkylenes, divalent C$_4$ to C$_{12}$ cyclic hydrocarbons and substituted and unsubstituted aryl groups in one example; and selected from the group consisting of C$_5$ to C$_8$ cyclic hydrocarbons, —CH$_2$CH$_2$—, =CR$_2$ and =SiR$_2$ in a more particular example; where R is selected from the group consisting of alkyls, cycloalkyls, aryls, alkoxys, fluoroalkyls and heteroatom-containing hydrocarbons in one example; and R is selected from the group consisting of C$_1$ to C$_6$ alkyls, substituted phenyls, phenyl, and C$_1$ to C$_6$ alkoxys in a more particular example; and R is selected from the group consisting of methoxy, methyl, phenoxy, and phenyl in yet a more particular example; where A can be absent in yet another example, in which case each R* is defined as for R$^1$-R$^{12}$; each X is as described above in formula (I); n is an integer from 0 to 4, and from 1 to 3 in another example, and 1 or 2 in yet another example; and R$^1$ through R$^{12}$ are independently selected from the group consisting of hydrogen radical, halogen radicals, C$_1$ to C$_{12}$ alkyls, C$_2$ to C$_{12}$ alkenyls, C$_6$ to C$_{12}$ aryls, C$_7$ to C$_{20}$ alkylaryls, C$_1$ to C$_{12}$ alkoxys, C$_1$ to C$_{12}$ fluoroalkyls, C$_6$ to C$_{12}$ fluoroaryls, and C$_1$ to C$_{12}$ heteroatom-containing hydrocarbons and substituted derivatives thereof, in one example; selected from the group consisting of hydrogen radical, fluorine radical, chlorine radical, bromine radical, C$_1$ to C$_6$ alkyls, C$_2$ to C$_6$ alkenyls, C$_7$ to C$_{18}$ alkylaryls, C$_1$ to C$_6$ fluoroalkyls, C$_2$ to C$_6$ fluoroalkenyls, C$_7$ to C$_{18}$ fluoroalkylaryls in a more particular example; and hydrogen radical, fluorine radical, chlorine radical, methyl, ethyl, propyl, isopropyl, butyl, isobutyl, tertiary butyl, hexyl, phenyl, 2,6-di-methylphenyl, and 4-tertiarybutylphenyl groups in yet a more particular example; where adjacent R groups can form a ring, either saturated, partially saturated, or completely saturated.

The structure of the metallocene compound represented by formula (Va) can take on many forms, such as those disclosed in, for example, U.S. Pat. Nos. 5,026,798, 5,703,187, and 5,747,406, including a dimer or oligomeric structure, such as disclosed in, for example, U.S. Pat. Nos. 5,026,798 and 6,069,213.

The metallocene compound represented by formula (Vd), R$^1$ and R$^2$ can form a conjugated 6-membered carbon ring system that can or can not be substituted.

It is contemplated that the metallocene compounds discussed and described above include their structural or optical or enantiomeric isomers (racemic mixture), and, in one example, can be a pure enantiomer. As used herein, a single, bridged, asymmetrically substituted metallocene compound having a racemic and/or meso isomer does not, itself, constitute at least two different bridged, metallocene compounds. The "metallocene catalyst" or "metallocene compound" can include any combination of any "example" discussed and described herein.

In addition to the metallocene compounds discussed and described above, other suitable metallocene compounds can include, but are not limited to, metallocenes discussed and described in U.S. Pat. Nos. 7,179,876; 7,169,864; 7,157,531; 7,129,302; 6,995,109; 6,958,306; 6,884,748; 6,689,847; U.S. Patent Application Publication Nos. 2006/0293470 and 2007/0055028; and WO Publications WO 97/22635; WO 00/699/22; WO 01/30860; WO 01/30861; WO 02/46246; WO 02/50088; WO 04/026921; and WO 06/019494.

Representative Group 15-containing metal compounds and preparation thereof can be as discussed and described in U.S. Pat. Nos. 5,318,935; 5,889,128; 6,333,389; 6,271,325; and 6,689,847; WO Publications WO 99/01460; WO 98/46651; WO 2009/064404; WO 2009/064452; and WO 2009/064482; and EP 0 893 454; and EP 0 894 005.

Suitable chromium catalysts can include di-substituted chromates, such as CrO$_2$(OR)$_2$; where R is triphenylsilane or a tertiary polyalicyclic alkyl. The chromium catalyst system can further include CrO$_3$, chromocene, silyl chromate, chromyl chloride (CrO$_2$Cl$_2$), chromium-2-ethyl-hexanoate, chromium acetylacetonate (Cr(AcAc)$_3$), and the like.

Illustrative Ziegler-Natta catalyst compounds can be as discussed and described in Ziegler Catalysts 363-386 (G. Fink, R. Mulhaupt and H. H. Brintzinger, eds., Springer-Verlag 1995); or in European Patent Nos. EP 0103120; EP 0102503; EP 0231102; EP 0703246; U.S. Pat. Nos. RE 33,683; 4,302,565; 5,518,973; 5,525,678; 5,288,933; 5,290,745; 5,093,415; and 6,562,905. Examples of such catalysts include those comprising Group 4, 5, or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts are those traditional Ziegler-Natta catalysts that are well known in the art. These conventional-type transition metal catalysts can be represented by the formula: MR$_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include TiCl$_4$, TiBr$_4$, Ti(OC$_2$H$_5$)$_3$Cl, Ti(OC$_2$H$_5$)Cl$_3$, Ti(OC$_4$H$_9$)$_3$Cl, Ti(OC$_3$H$_7$)$_2$Cl$_2$, Ti(OC$_2$H$_5$)$_2$Br$_2$, TiCl$_{3.1}$/3AlCl$_3$ and Ti(OCl$_2$H$_{25}$)Cl$_3$.

Catalysts derived from Mg/Ti/Cl/THF can be used. One example of the general method of preparation of such a catalyst includes the following: dissolve TiCl4 in THF, reduce the compound to TiCl$_3$ using Mg, add MgCl$_2$, and remove the solvent. Specific examples of other conventional-type transition metal catalysts are discussed and described in more detail in U.S. Pat. Nos. 4,115,639; 4,077,904; 4,482,687; 4,564,605; 4,721,763; 4,879,359; and 4,960,741. Conventional-type transition metal catalyst compounds based on magnesium/titanium electron-donor complexes are described in, for example, U.S. Pat. Nos. 4,302,565 and 4,302,566.

The catalyst system can include a mixed catalyst, which can be a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, the terms "bimetallic catalyst composition," "bimetallic catalyst," "multi-catalyst composition," and "multi-catalyst" will be collectively referred to herein as a "mixed catalyst" unless specifically noted otherwise. In one preferred example, the mixed catalyst includes at least one metallocene catalyst compound and at least one non-metallocene catalyst compound.

The catalyst system, as discussed above, includes the catalyst compound, activator, and filler material. The amount of catalyst compound in the spray dried catalyst system can range from a low of about 0.01 mmol, about 0.02 mmol, or about 0.03 mmol to a high of about 0.06 mmol, about 0.07 mmol, about 0.08 mmol, or about 1 mmol, based on the amount of metal in the catalyst compound per gram of catalyst system. For example, if the catalyst system includes a metallocene compound containing a Hf metal atom, the amount of metallocene compound can be based on the amount of Hf (mmol) per gram of the catalyst system.

Activator

As used herein, the terms "activator" and "cocatalyst" are used interchangeably and refer to any compound or combination of compounds, supported or unsupported, which can activate a catalyst compound or component, such as by creating a cationic species of the catalyst component. For example, this can include the abstraction of at least one leaving group (the "X" group in the single site catalyst compounds described herein) from the metal center of the catalyst compound/component.

The activator can include a Lewis acid or a non-coordinating ionic activator or ionizing activator, or any other compound including Lewis bases, aluminum alkyls, and/or conventional-type cocatalysts. The activator can include on or more organo-aluminum compounds. The activator can include aluminoxanes and modified aluminoxanes. For example, the activator can be or include methylaluminoxane ("MAO") and/or modified methylaluminoxane ("MMAO"). Other illustrative activators can include, but are not limited to, ionizing compounds, neutral or ionic, such as tri(n-butyl) ammonium tetrakis(pentafluorophenyl)boron, a trisperfluorophenyl boron metalloid precursor, a trisperfluoronaphthyl boron metalloid precursor, or any combinations thereof.

Aluminoxanes can be described as oligomeric aluminum compounds having —Al(R)—O— subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. One or more trialkylaluminum compounds can be used in lieu of or in conjunction with one or more aluminoxanes. Examples of trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, diethylaluminum ethoxide, tributylaluminum, diisobutylaluminum hydride, and the like.

Aluminoxanes can be produced by the hydrolysis of the respective trialkylaluminum compound. MMAO can be produced by the hydrolysis of trimethylaluminum and a higher trialkylaluminum such as triisobutylaluminum. MMAOs are generally more soluble in aliphatic solvents and more stable during storage. There are a variety of methods for preparing aluminoxanes and modified aluminoxanes, non-limiting examples can be as discussed and described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; and 5,939,346; and EP 0561476; EP 0279586; EP 0594218; and EP 0586665; and WO Publications WO 94/10180 and WO 99/15534.

A visually clear MAO can be used. For example, a cloudy and/or gelled aluminoxane can be filtered to produce a clear aluminoxane or clear aluminoxane can be decanted from a cloudy aluminoxane solution. In another example, a cloudy and/or gelled aluminoxane can be used. Another aluminoxane can include a modified methyl aluminoxane ("MMAO") type 3A (commercially available from Akzo Chemicals, Inc. under the trade name Modified Methylaluminoxane type 3A, discussed and described in U.S. Pat. No. 5,041,584). A suitable source of MAO can be a solution having from about 1 wt % to about a 50 wt % MAO, for example. Commercially available MAO solutions can include the 10 wt % and 30 wt % MAO solutions available from Albemarle Corporation, of Baton Rouge, La.

An ionizing or stoichiometric activator, neutral or ionic, such as tri(n-butyl)ammonium tetrakis(pentafluorophenyl) boron, a trisperfluorophenyl boron metalloid precursor or a trisperfluoronaphthyl boron metalloid precursor, polyhalogenated heteroborane anions (WO Publication WO 98/43983), boric acid (U.S. Pat. No. 5,942,459), or combinations thereof can be used. The activator can include neutral or ionic compounds, alone or in combination with aluminoxanes and/or modified aluminoxanes.

Examples of neutral stoichiometric activators can include tri-substituted boron, tellurium, aluminum, gallium, indium, or any combination thereof. The three substituent groups can each be independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having from 1 to 20 carbon atoms, alkyl groups having from 1 to 20 carbon atoms, alkoxy groups having from 1 to 20 carbon atoms and aryl groups having from 3 to 20 carbon atoms (including substituted aryls). More preferably, the three groups are alkyls having from 1 to 4 carbon groups, phenyl, naphthyl or mixtures thereof. Even more preferably, the three groups are halogenated, preferably fluorinated, aryl groups. Most preferably, the neutral stoichiometric activator is trisperfluorophenyl boron or trisperfluoronaphthyl boron.

Non-coordinating anions can also be used, which can sometimes be referred to as weakly coordinating anions. The term "non-coordinating anion" ("NCA") refers to an anion which either does not coordinate to a cation or which is only weakly coordinated to a cation thereby remaining sufficiently labile to be displaced by a neutral Lewis base. "Compatible" non-coordinating anions refers to those which are not degraded to neutrality when the initially formed complex decomposes. Illustrative non-coordinating anions can be or include those that are compatible, stabilize the metal cation in the sense of balancing its ionic charge, yet retain sufficient lability to permit displacement by an ethylenically or acetylenically unsaturated monomer during polymerization.

Illustrative anions can be as discussed and described in U.S. Pat. No. 5,278,119, and WO Publications WO 2002/102857; WO 2002/051884; WO 2002/018452; WO 2000/037513; WO 2000/029454; WO 2000/004058; WO 99/064476; WO 2003/049856; WO 2003/051892; WO 2003/040070; WO 2003/000740; WO 2002/036639; WO 2002/000738; WO 2002/000666; WO 2001/081435; WO 2001/042249; and WO 2000/004059. Further discussion of suitable anions can be found in review articles by S. H. Strauss, "The Search for Larger and More Weakly Coordinating Anions," Chem. Rev., 93, 927-942 (1993) and C. A. Reed, "Carboranes: A New Class of Weakly Coordinating Anions for Strong Electrophiles, Oxidants and Superacids," Acc. Chem. Res., 31, 133-139 (1998).

Activators for conventional-type transition metal catalysts can be represented by the formula $M_3M_{4\nu}X_{2c}R_{3b-c}$, where $M_3$ is a metal from Group 1 to 3 and 12 to 13 of the Periodic Table of Elements; $M_4$ is a metal of Group 1 of the Periodic Table of Elements; v is a number from 0 to 1; each $X_2$ is any halogen;

c is a number from 0 to 3; each $R_3$ is a monovalent hydrocarbon radical or hydrogen; b is a number from 1 to 4; and where b minus c is at least 1. Other conventional-type organometallic compounds for the above conventional-type transition metal catalysts can have the formula $M_3R_3k$, where $M_3$ is a Group IA, IIA, IIB or IIIA metal, such as lithium, sodium, beryllium, barium, boron, aluminum, zinc, cadmium, and gallium; k equals 1, 2, or 3 depending upon the valency of $M_3$ which valency in turn normally depends upon the particular Group to which $M_3$ belongs; and each $R_3$ can be any monovalent radical that include hydrocarbon radicals and hydrocarbon radicals containing a Group 13 to 16 element like fluoride, aluminum or oxygen or a combination thereof.

The ratio of the activator to the metallocene compound in the spray dried catalyst system can range from about 2:1 to about 100,000:1, based on moles of activator to moles of catalyst compound. In another example, the amount of activator in the spray dried catalyst system can range from about 10:1 to about 10,000:1, from about 50:1 to about 5,000:1, or from about 100:1 to about 1,000:1 based on moles of activator to moles of metallocene compound.

If the activator is an aluminoxane, the amount of the aluminoxane can be determined based on the amount of aluminum (Al) contained in the aluminoxane. The aluminoxane can be present in the catalyst system in an amount of about 10 mmol or less, about 9 mmol or less, about 8 mmol or less, about 7 mmol or less, about 6 mmol or less, about 5 mmol or less, or about 4 mmol or less per gram of the catalyst system. If the activator is an aluminoxane, the aluminoxane can be present in the catalyst system in an amount ranging from a low of about 3 mmol, about 4 mmol, about 5 mmol, about 5.5 mmol, or about 6 mmol to a high of about 6.5 mmol, about 7 mmol, or about 7.5 mmol per gram of the catalyst system.

Filler Material

Any solid material that is inert to the other components of the catalyst system and subsequent polymerization can be used as the filler material. The filler material can be or include solid, finely dispersed particulates. The filler material can provide bulk and/or strength to the spray dried catalyst system. The filler material can also reduce or prevent spray dried catalyst system particles or particulates from disintegrating. Illustrative filler materials can include, but are not limited to, silica, e.g. fumed silica, alumina, e.g. fumed alumina, boron nitride, titanium dioxide, zinc oxide, polystyrene, calcium carbonate, or any combination thereof. Fumed, hydrophobic, surface modified, silica ("fumed silica") can be a preferred filler material because it can impart increased viscosity to the slurry and good strength to the spray dried catalyst system particles. The filler material can be free of absorbed water. The filler material can be surface modified. For example, the filler material can be surface modified via a silane treatment that can remove at least some of the reactive hydroxyl or other functional groups therefrom. The silane treatment can include treating the filler material with dimethyldichlorosilane.

The filler material is not required to provide or act as an inert support for the catalyst compound. In other words, the catalyst compound does not need to be supported by the filler material. In another example, the filler material is not required to provide or act as an inert support for the catalyst compound and activator. In other words, the catalyst compound and activator do not need to be supported by the filler material. Accordingly, filler materials having high internal porosity are not essential for use with the catalyst compound, the activator, or the combination thereof. The filler material can have a pore volume of less than about 3 $cm^3/g$, less than about 2 $cm^3/g$, less than about 1 $cm^3/g$, or less than about 0.5 $cm^3/g$.

The filler material can have an average particle size of less than about 150 μm, less than about 120 μm, less than about 100 μm, less than about 75 μm, or less than about 50 μm. For example, the average particle size of the filler material can range from a low of about 0.05 μm, about 0.1 μm, about 1 μm, or about 5 μm to a high of about 40 μm, about 60 μm, about 80 μm, about 100 μm, or about 150 μm. In another example, the filler material can have an average particle size from about 0.1 μm to about 80 μm, about 0.1 μm to about 50 μm, or about 0.1 μm to about 20 μm. Suitable filler materials can include, but are not limited to, Cabosil TS-610, Cabosil M-5, or a combination thereof, both available from Cabot Corporation.

Preparation of Spray Dried Catalyst System

Preparation of the spray dried catalyst system can include mixing or otherwise combining the one or more catalyst compounds, one or more activators, one or more filler materials, and one or more diluents to produce a suspension. The suspension can then be spray dried to produce the spray dried catalyst system.

The components of the suspension can be combined in any suitable order or sequence. For example, the diluent or a portion of the diluent, the filler material, and the activator can be combined to produce a first mixture. The first mixture can be stirred or otherwise mixed for a period of time ranging from about 1 minute to about 24 hours. The first mixture can be mixed at a temperature ranging from room temperature up to a temperature of about 40° C., about 60° C., about 80° C., or about 100° C. After mixing the first mixture the catalyst compound(s) can be combined with the first mixture to produce a second mixture. If only a portion of the diluent is combined in the first mixture, the catalyst compound(s) and the remaining diluent can first be combined and then added to the first mixture to produce the second mixture. The second mixture can be mixed for a period of time ranging from about 1 minute to about 24 hours. The second mixture can be mixed at a temperature ranging from room temperature to about 40° C., about 60° C., about 80° C., or about 100° C. The first mixture and/or the second mixture can be mixed under an inert atmosphere such as nitrogen.

The diluent(s) can be or include any material capable of dissolving or suspending the metallocene catalyst compound and activator and suspending the filler material. Illustrative diluents can include, but are not limited to, linear and/or branched alkanes such as ethane, propane, butane, isobutene, pentane, isopentane, hexane, heptane, octane, decne, dodecane, hexadecane, octadecane, and the like; alicyclic hydrocarbons such as cyclopentane, methylcyclopentane, cyclohexane, cyclooctane, norbornane, ethylcyclohexane, and the like; aromatic hydrocarbons such as benzene, toluene, ethylebenzene, propylbenzene, butylbenzene, xylene, and the like; petroleum fractions such as gasoline, kerosene, light oils, and the like. Likewise, halogenated hydrocarbons such as methylene chloride, dichloromethane, chlorobenzne, and the like, can also be used. Any two or more diluents can be used together to provide the diluent. The diluent can have a boiling point ranging from about 0° C. to about 150° C.

The particular amount or concentration of the various components of the catalyst system in the suspension can vary depending, at least in part, on the particular catalyst compound(s), activator(s), filler material(s), and/or diluent(s) present therein. For example, the suspension can have a concentration of the catalyst compound ranging from a low of about 0.05 wt %, about 0.09 wt %, or about 0.15 wt % to a high of about 0.4 wt %, about 0.8 wt %, or about 1.2 wt %. In another example, the suspension can have a catalyst compound concentration of from about 0.13 wt % to about 0.22 wt %, about 0.14 wt % to about 0.2 wt %, or about 0.15 wt % to about 0.19 wt %. The suspension can have a concentration of the filler material ranging from a low of about 1 wt %, about 3 wt % or about 5 wt % to a high of about 10 wt %, about 15 wt %, or about 20 wt %. In another example, the suspension can have a concentration of the filler material of from about 3 wt % to about 8 wt %, about 4 wt % to about 7 wt %, or about 5 wt % to about 6 wt %. The suspension can have a concentration of the activator ranging from a low of about 1 wt %, about 2 wt %, or about 3 wt % to a high of about 6 wt %, about 8 wt %, or about 10 wt %. The suspension can have a diluent concentration ranging from a low of about 70 wt %, about 75 wt %, or about 80 wt % to a high of about 90 wt %, about 95 wt %, or about 98 wt %.

The suspension can be atomized and introduced into a stream of heated, inert drying gas such as nitrogen, argon, propane, and the like, or any combination thereof to evaporate the diluent and produce solid-form particles of the metallocene catalyst compound and activator in a matrix of the filler material. The volumetric flow of the drying gas can be greater than the volumetric flow of the suspension. The suspension can be atomized using any suitable device(s), system(s), or combination of device(s) and/or system(s). For example, the suspension can be atomized via an atomizing nozzle or a centrifugal high speed disc atomizer.

Atomization of the suspension via an atomizing nozzle can also include mixing the suspension with an atomizing gas. The temperature of the atomizing nozzle can be at or above the boiling point of the highest boiling component of the final suspension. The atomized suspension can be introduced to a drying chamber where the volatiles can dry in the presence of the heated, inert drying gas. If any spray dried catalyst system particles having an undesirably large diameter are produced, at least a portion of those over-sized particles can be separated within a collection zone of the drying chamber. Spray dried catalyst system particles having a desired size can be recovered from the drying chamber and can then be separated from the inert drying gas. For example, the spray dried catalyst system particles and the drying gas can be separated within a cyclone. Other suitable processes for preparing the spray dried catalyst system can be similar to those discussed and described in, for example, U.S. Pat. Nos. 4,638,029; 4,728,705; 5,290,745; 5,306,350; 5,604,172; 5,716,558; 6,982,236; and U.S. Patent Application Publication Nos. 2006/0293470 and 2007/0191215.

Spray drying produces discrete catalyst system particles or particulates after evaporation of the diluent. The amount of filler present in the spray dried catalyst system can range from a low of about 5 wt %, about 10 wt %, about 15 wt %, or about 20 wt % to a high of about 50 wt %, about 60 wt %, about 70 wt %, or about 80 wt %, based on total weight of the spray dried catalyst system. For example, the spray dried catalyst system can contain from about 50 wt % to about 70 wt %, from about 52 wt % to about 65 wt %, or from about 54 wt % to about 60 wt %, based on the total weight of the filler material, the catalyst compound(s), and the activator(s).

The spray dried catalyst system can have an average particle size ranging from about 1 µm to about 500 µm. For example, the spray dried catalyst system can have an average particle size ranging from a low of about 1 µm, about 5 µm, or about 10 µm to a high of about 50 µm, about 80 µm, or about 100 µm. In another example, the spray dried catalyst system can have an average particle size of from about 5 µm to about 100µ, from about 10 µm to about 80 µm, or from about 15 µm to about 70 µm. The spray dried catalyst system can have a bulk density ranging from a low of about 0.2 g/cm$^3$, about 0.24 g/cm$^3$, or about 0.28 g/cm$^3$ to a high of about 0.32 g/cm$^3$, about 0.35 g/cm$^3$, or about 0.38 g/cm$^3$.

Preparation of the Catalyst Slurry

The spray dried catalyst system can be mixed or otherwise combined with one or more diluents or carriers to produce the catalyst slurry. Preferably, the one or more diluents can be inert or non-reactive with the catalyst system. Illustrative diluents can include, but are not limited to, aliphatic hydrocarbons, aromatic hydrocarbons, or a combination thereof. For example, the one or more diluents can be or include a mineral oil.

The diluent for producing the catalyst slurry can include a mixture of mineral oil and aliphatic hydrocarbons. For example, the concentration of mineral oil in the diluent can range from a low of about 60 wt %, about 70 wt %, or about 75 wt % to a high of about 80 wt %, about 90 wt %, or about 99 wt %. The concentration of aliphatic hydrocarbons not contained in the mineral oil can range from a low of about 1 wt %, about 5 wt %, or about 10 wt % to a high of about 20 wt %, about 30 wt %, or about 40 wt %. The ratio of mineral oil to aliphatic hydrocarbons not contained in the mineral oil can range from about 1.5:1 to about 100:1, from about 2:1 to about 50:1, from about 3:1 to about 25:1, or from about 5:1 to about 10:1. A suitable, commercially available mineral oil can be or include Hydrobrite 380, available from BASF. A suitable, commercially available aliphatic/isoparaffinic hydrocarbon can be or include Isopar C, available from ExxonMobil Chemical Company.

The diluent can be added to the spray dried catalyst system to produce the catalyst slurry. In another example, the spray dried catalyst system can be added to the diluent to produce the catalyst slurry. After combining the diluent and the spray dried catalyst system the mixture can be stirred or otherwise mixed for a period of time ranging from about 1 minute to about 24 hours to produce the catalyst slurry. The diluent and spray dried catalyst system can be mixed at a temperature ranging from room temperature up to a temperature of about 40° C., about 60° C., about 80° C., or about 100° C.

The catalyst slurry can have any desired ratio of the diluent to the spray dried catalyst system. For example, the concentration of the diluent in the catalyst slurry can range from a low of about 60 wt %, about 70 wt %, or about 75 wt % to a high of about 80 w %, about 85 wt %, or about 90 wt %. The concentration of the spray dried catalyst system in the catalyst slurry can range from a low of about 10 wt %, about 15 wt %, or about 20 wt % to a high of about 25 wt %, about 30 wt %, or about 40 wt %. In another example, the concentration of the diluent in the catalyst slurry can range from about 75 wt % to about 85 wt % and the concentration of the spray dried catalyst system in the catalyst slurry can range from about 15 wt % to about 25 wt %. The catalyst slurry can have a density ranging from a low of 0.75 g/cm$^3$, about 0.8 g/cm$^3$, or about 0.85 g/cm$^3$ to a high of about 0.9 g/cm$^3$, about 0.95 g/cm$^3$, or about 1.1 g/cm$^3$.

Continuity Additive

The continuity additive can interact with the particles and other components in the fluidized bed. For example, the continuity additive can reduce or neutralize static charges related to frictional interaction of the catalyst and polymer particles. The continuity additive can also react or complex with various charge-containing compounds that can be present or formed in the reactor. The continuity additive can also react or complex with oxygenates and other catalyst poisons. The continuity additive can also be referred to as a static control agent.

As used herein, the term "continuity additive" refers to a compound or composition that when introduced into a gas phase fluidized bed reactor can influence or drive the static charge (negatively, positively, or to zero) in the fluidized bed.

The continuity additive or combination of continuity additives can depend, at least in part, on the nature of the static charge. The particular continuity additive or combination of continuity additives can depend, at least in part, on the particular polymer being produced within the polymerization reactor, the particular spray dried catalyst system or combination of catalyst systems being used, or a combination thereof. Suitable continuity additives and use thereof can be as discussed and described in European Patent No. 0 229 368; U.S. Pat. No. 5,283,278; and WO Publication No. WO2009/023111, for example.

If the static charge is negative, then continuity additives such as positive charge generating compounds can be used. Illustrative positive charge generating continuity additives can include, but are not limited to, MgO, ZnO, $Al_2O_3$, CuO, alcohols, oxygen, nitric oxide, or combinations thereof. Other continuity additives suitable for controlling negative static charges can be as discussed and described in U.S. Pat. Nos. 4,803,251 and 4,555,370.

If the static charge is positive, then continuity additives such as negative charge generating compounds can be used. Illustrative negative charge generating continuity additives can include, but are not limited to, $V_2O_5$, $SiO_2$, $TiO_2$, $Fe_2O_3$, water, ketones containing up to 7 carbon atoms, or combinations thereof.

A preferable continuity additive can include aluminum distearate, which can be used alone or in combination with any other suitable continuity additives. Other suitable continuity additives can include, but are not limited to, aluminum distearate, ethoxlated amines, ethylenimine copolymers, or any combination thereof. Suitable, commercially available continuity additives can include, for example Irgastat AS-990 available from Huntsman and Lupasol FG available from BASF.

Still other continuity additives can include polyethylenimines having the formula —$(CH_2—CH_2—NH)_n$—, where n can be from about 10 to about 10,000. The polyethylenimines can be linear, branched, or hyperbranched (i.e., forming dendritic or arborescent polymer structures).

Any of the aforementioned continuity additives, as well as those described in, for example, WO Publication No. WO01/44322 and listed under the heading Carboxylate Metal Salt, including those chemicals and compositions listed as antistatic agents can be used either alone or in combination with any other continuity additive. For example, the carboxylate metal salt can be combined with an amine containing control agent. For example, a carboxylate metal salt with any family member belonging to the KEMAMINE® (available from Crompton Corporation) or ATMER (available from ICI America Inc.) family of products.

The continuity additive can be introduced to the reactor as a combination of two or more of the above listed continuity additives. The continuity additive(s) can be introduced to the reactor in the form of a solution or slurry. The continuity additive can be introduced to the reactor as an individual feed or can be combined with other feeds prior to introduction to the reactor. For example, the continuity additive can be combined with the spray dried catalyst system and/or the catalyst slurry prior to introducing the combined catalyst slurry/continuity additive mixture to the reactor.

The continuity additive can be introduced to the reactor separate from the catalyst slurry. In other words, the continuity additive and the catalyst slurry can be contacted within the reactor. In another example, the continuity additive can be mixed with the catalyst slurry and then introduced to the reactor as a mixture. In other words, the continuity additive and the catalyst slurry can be contacted outside the reactor. In still another example, a first portion of the continuity additive can be mixed with the catalyst slurry and introduced to the reactor and a second portion of the continuity additive can be introduced separately to the reactor. In other words, a first portion of the continuity additive and the catalyst slurry can be contacted outside the reactor and a second portion of the continuity additive can be contacted within the reactor with the mixture of the catalyst slurry and first portion of the continuity additive.

Suitable diluents for producing a continuity additive slurry or solution can include liquids that are inert or non-reactive with the catalyst system. Illustrative diluents can include, but are not limited to, aliphatic hydrocarbons, aromatic hydrocarbons, or a combination thereof. The one or more diluents can be or include a mineral oil or other light hydrocarbons.

The amount of continuity additive introduced to the reactor and/or the catalyst slurry can be sufficient to provide a continuity additive concentration of from about 0.05 ppmw to about 200 ppmw, based on the polymer production rate. For example, the continuity additive can be introduced to the reactor, i.e. directly to the reactor and/or combined with the catalyst slurry, in an amount ranging from a low of about 1 ppmw, about 2 ppmw, or about 3 ppmw to a high of about 35 ppmw, about 45 ppmw, or about 55 ppmw, based on the polymer production rate. The amount of continuity additive introduced to the reactor can depend, at least in part, on the particular catalyst system, reactor pre-conditioning such as coatings to control static buildup, and/or other factors.

Polymerization Process

Any polymerization process including, but not limited to, high pressure, solution, slurry, and/or gas phase processes can be used. Preferably, a gas phase process utilizing a fluidized bed reactor is used to polymerize ethylene and one or more optional comonomers to provide a polyethylene. More preferably, a continuous gas phase process utilizing a fluidized bed reactor is used to polymerize ethylene and one or more optional comonomers to provide a polyethylene.

The term "polyethylene" refers to a polymer having at least 50 wt % ethylene-derived units, preferably at least 70 wt % ethylene-derived units, more preferably at least 80 wt % ethylene-derived units, or 90 wt % ethylene-derived units, or 95 wt % ethylene-derived units, or 100 wt % ethylene-derived units. The polyethylene can thus be a homopolymer or a copolymer, including a terpolymer, having one or more other monomeric units. A polyethylene described herein can, for example, include at least one or more other olefins) and/or comonomer(s). Suitable comonomers can contain 3 to 16 carbon atoms in one example; from 3 to 12 carbon atoms in another example; from 4 to 10 carbon atoms in another example; and from 4 to 8 carbon atoms in yet another example. Other suitable polyethylenes can include copolymers of ethylene and one or more $C_3$-$C_{20}$ alpha olefins, $C_3$ to $C_{12}$ alpha olefins, or $C_4$ to $C_8$ alpha olefins. Illustrative comonomers include, but are not limited to, propylene, 1-butene, 1-pentene, 1-hexene, 1-heptene, 1-octene, 4-methylpent-1-ene, 1-decene, 1-dodecene, 1-hexadecene and the like.

Preferred examples of polyethylene products include ultra low density polyethylene ("ULDPE"), very low density polyethylene ("VLDPE"), linear low density polyethylene ("LLDPE"), low density polyethylene ("LDPE"), medium density polyethylene ("MDPE"), high density polyethylene ("HDPE"), random copolymer of ethylene and propylene and/or 1-butene and/or 1-hexene, elastomers such as ethylene propylene rubber, ethylene propylene diene monomer rubber, neoprene, and blends of thermoplastic polymers and elastomers, such as for example, thermoplastic elastomers and rubber toughened plastics.

A suitable gas phase fluidized bed reactor can include a reaction zone and a so-called velocity reduction zone. The reaction zone can include a bed of growing polymer particles, formed polymer particles and a minor amount of catalyst particles fluidized by the continuous flow of the gaseous monomer and optionally one or more induced condensing agents or ICAs to remove heat of polymerization from the reaction zone. Optionally, some of the re-circulated gases, e.g. ICAs can be cooled and compressed to form liquids that increase the heat removal capacity of the circulating gas stream when readmitted to the reaction zone. Illustrative ICAs can include, but are not limited to, propane, butane, isobutane, pentane, isopentane, hexane, isomers thereof, derivatives thereof, and combinations thereof.

A suitable rate of gas flow can be readily determined by simple experiment. The rate of gas flow or the superficial gas velocity can preferably be at least two times a minimum flow velocity, i.e. the minimum flow rate required to maintain a fluidized bed. The superficial gas velocity can range from about 0.3 m/s to about 2 m/s, about 0.35 m/s to about 1.7 m/s, or from about 0.4 m/s to about 1.5 m/s. Ordinarily, the superficial gas velocity does not exceed 1.5 m/s and usually no more than 0.76 m/s is sufficient.

Make-up of gaseous monomer to the circulating gas stream can be at a rate equal to or substantially equal to the rate at which particulate polymer product and monomer associated therewith is withdrawn from the reactor and the composition of the gas passing through the reactor can be adjusted to maintain an essentially steady state gaseous composition within the reaction zone. The gas leaving the reaction zone can be passed to the velocity reduction zone where entrained particles are removed. Finer entrained particles and dust can be removed in a cyclone and/or fines filter. The gas can be passed through a heat exchanger where at least a portion of the heat of polymerization can be removed, compressed in a compressor, and then returned to the reaction zone.

The catalyst slurry can be introduced or delivered to the reactor using any suitable device, system, or combination of devices and/or systems. One example of a catalyst slurry delivery system can include one or more effervescent nozzles in which a stream of liquid or gas can flow through an inner tube, while the catalyst slurry can flow co-currently through an annular space defined by the inner tube and a concentric outer tube. The direction of flow of the liquid and/or gas is generally along the central axis of the tubes. For example, the catalyst slurry can flow through the annular space and a gas such as nitrogen can flow through the inner tube. The catalyst slurry and gas can mix within the annular space toward a distal end of the nozzle. For example, toward the distal end or tip of the inner tube, though not necessarily at the end, there can be holes or orifices that allow the gas to enter the catalyst slurry. The gas can be introduced into the co-current flowing catalyst slurry near a common exit orifice of the nozzle. In this way, catalyst slurry slugging can be prevented and steady droplet formation can be promoted. Gas bubbles that form upon mixing the gas and catalyst slurry can be forced through an orifice at the tip of the outer tube, forcing the concurrent flow of catalyst slurry along the outside edge of the orifice. A thin film of catalyst slurry on the orifice wall can be ejected from the orifice in thin sheets which disintegrate into small droplets within the fluidized bed polymerization reactor. As such, the effervescent nozzle can cause the catalyst slurry to disperse into small droplets upon exiting the effervescent nozzle. Other suitable effervescent nozzles suitable for introducing the catalyst slurry to the reactor can be similar to those discussed and described in U.S. Pat. Nos. 5,962,606 and 6,075,101; European Patent No. 0961784B1; and WO Publication Nos. WO 98/37101; WO 2008/042078A1; WO 2008/042177A1; and WO 2008/042182A1.

Another example of a catalyst slurry delivery system can include one or more effervescent nozzles in which a stream of liquid or gas can flow through a first or "inner" conduit, the catalyst slurry can flow through an annulus formed between the first conduit and a second or "intermediate" conduit, and a feed stream can flow through an annulus formed between the second conduit and a third or "outer" conduit. The liquid or gas flowing through the first or inner conduit can mix or otherwise combine with the catalyst slurry similar as discussed above. The feed stream and the catalyst slurry/gas or liquid mixture can contact one another within the reactor. The effervescent nozzle suitable for introducing the catalyst slurry and the feed stream to the reactor can be similar to the nozzle discussed and described in U.S. Patent Application Publication No. 2010/0041841.

The continuity additive can be mixed with the catalyst slurry and introduced via one or more of the effervescent nozzles. The continuity additive can be mixed with the gas that can be introduced separately from the catalyst slurry via the effervescent nozzle and then combined or mixed with the catalyst slurry within the effervescent nozzle(s). The continuity additive can be introduced to the fluidized bed via one or more independent nozzles or other suitable introduction devices such that the continuity additive contacts the catalyst slurry within the fluidized bed.

Hydrogen gas can be used in olefin polymerization to control the final properties of the polyolefin, such as described in "Polypropylene Handbook," at pages 76-78 (Hanser Publishers, 1996). Using certain catalyst systems, increasing concentrations (partial pressures) of hydrogen can increase the melt index (MI) of the polyolefin generated. The MI can thus be influenced by the hydrogen concentration. The amount of hydrogen in the polymerization reactor can be expressed as a mole ratio relative to the total polymerizable monomer, for example, ethylene, or a blend of ethylene and hexane or propylene. The amount of hydrogen used in the polymerization process can be an amount necessary to achieve the desired MI of the final polyolefin resin. The mole ratio of hydrogen to total monomer ($H_2$:monomer) can be in a range from greater than 0.0001 in one example, and from greater than 0.0005 in another example, and from greater than 0.001 in yet another example, and less than 10 in yet another example, and less than 5 in yet another example, and less than 3 in yet another example, and less than 0.10 in yet another example, where a desirable range can include any combination of any upper mole ratio limit with any lower mole ratio limit described herein. Expressed another way, the amount of hydrogen in the reactor at any time can range to up to 5,000 ppm, and up to 4,000 ppm in another example, and up to 3,000 ppm in yet another example, and between 50 ppm and 5,000 ppm in yet another example, and between 500 ppm and 2,000 ppm in another example. In yet another example, the ratio of hydrogen to total monomer ($H_2$:monomer) can be about 0.00001:1 to about 2:1, about 0.005:1 to about 1.5:1, or about 0.0001:1 to about 1:1.

The reactor temperature can range from about 30° C., about 40° C., or about 50° C. to about 90° C., about 100° C., about 110° C., about 120° C., or about 150° C. In general, the reactor temperature can be operated at the highest feasible temperature taking into account the sintering temperature of the polymer product within the reactor. Regardless of the process used to make the polyolefins the polymerization temperature or reaction temperature should be below the melting or "sintering" temperature of the polyolefins to be formed. Thus, the upper temperature limit in one example can be the melting temperature of the polyolefin produced in the reactor.

The pressure within the gas phase polymerization reactor (either single stage or two or more stages) can vary from about 700 kPa to about 3,500 kPa, and in the range of from about 1,350 kPa to about 3,000 kPa in another example, and in the range of from about 1,600 kPa to about 2,000 kPa in yet another example.

The gas phase reactor can be capable of producing from about 10 kg of polymer per hour to about 90,000 kg/hr, and greater than about 450 kg/hr in another example, and greater than about 4,500 kg/hr in yet another example, and greater than about 10,000 kg/hr in yet another example, and greater than about 15,000 kg/hr in yet another example, and greater than about 30,000 kg/hr in yet another example, and from about 30,000 kg/hr to about 75,000 kg/hr in yet another example. Additional reactor details and means for operating the reactor can be as discussed and described in, for example, U.S. Pat. Nos. 3,709,853; 4,003,712; 4,011,382; 4,302,566; 4,543,399; 4,882,400; 5,352,749; and 5,541,270; European Patent No. EP 0802202; and Belgian Patent No. 839,380.

The catalyst slurry can polymerize one or more olefins at a catalyst productivity of at least 12,000, at least 13,000, at least 14,000, at least 15,000, at least 16,000, at least 17,000, at least 18,000, at least 19,000, at least 20,000, or at least 21,000 grams polymer per gram catalyst system (gPE/g CatSys). The catalyst slurry can polymerize one or more olefins at a catalyst productivity ranging from a low of about 12,500, about 13,500, or about 14,500 to a high of about 15,500, about 16,500, about 17,500, about 18,500, about 19,500, about 20,500, or about 21,500 gPE/g CatSys, with suitable ranges comprising the combination of any lower activity and any upper activity.

The catalyst slurry can polymerize one or more olefins at a catalyst productivity of at least 14,000, at least 15,000, at least 16,000, at least 17,000, at least 18,000, at least 19,000, at least 20,000, or at least 21,000 gPE/g CatSys in a gas phase fluidized bed reactor producing at least 4,500 kg polymer per hour or more. For example, the catalyst slurry can polymerize one or more olefins at a catalyst productivity of about 16,000, about 16,200, about 16,400, about 16,600, about 16,800, or about 17,000 gPE/g CatSys in a gas phase fluidized bed reactor producing at least 4,500 kg polymer per hour or more.

Introducing the catalyst slurry and the continuity additive to the gas phase fluidized bed reactor can produce one or more polyolefin products without forming or generating agglomerates in the form of rubble, chunks, lumps, sheets, and/or the like. In other words, polymerization can be carried out without causing the formation of a detectable level of agglomerates such as rubble, chunks, lumps, sheets, and/or the like.

The polymerization reactor can be operated on a continuous or semi-continuous basis, i.e. without shutdown, for a time period ranging from a few hours to several days or weeks. For example, the polymerization reactor to which the catalyst slurry is continuously or semi-continuously introduced can be operated for about a day, about 2 days, about 3 days, about 5 days, about 7 days, about 10 days, about 15 days, or more with no detectable formation of agglomerates therein. In another example, the catalyst slurry and the continuity additive can be introduced to the polymerization reactor in a continuous or semi-continuous manner for a period of at least 3 days without the formation or generation of agglomerates in the form of rubble, chunks, lumps, sheets, and/or the like.

The polyethylene can have an $I_{21}/I_2$ ratio ($I_{21}$ is measured by ASTM-D-1238-F, (190° C./21.6 kg); $I_2$ is measured by ASTM-D-1238-E, (190° C./2.16 kg)) ranging from a low of about 0.5, about 1, or about 5 to a high of about 30, about 100, or about 250. For example, the polyethylene can have an $I_{21}/I_2$ ratio of from about 0.5 to about 10, from about 0.8 to about 5, or from about 0.9 to about 2.5. In another example, the polyethylene can have a $I_{21}/I_2$ ratio of from about 10 to about 50, from about 20 to about 40, or from about 30 to about 45.

Density can be determined in accordance with ASTM D-792. The polyethylene can have a density ranging from a low of about 0.89 g/cm$^3$, about 0.90 g/cm$^3$, or about 0.91 g/cm$^3$ to a high of about 0.95 g/cm$^3$, about 0.96 g/cm$^3$, or about 0.97 g/cm$^3$. The polyethylene can have a bulk density, measured in accordance with ASTM-D-1238, of from about 0.25 g/cm$^3$ to about 0.5 g/cm$^3$. For example, the bulk density of the polyethylene can range from a low of about 0.30 g/cm$^3$, about 0.32 g/cm$^3$, or about 0.33 g/cm$^3$ to a high of about 0.40 g/cm$^3$, about 0.44 g/cm$^3$, or about 0.48 g/cm$^3$.

The polyethylene can be suitable for such articles as films, fibers, and nonwoven fabrics, extruded articles and molded articles. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multilayered constructions in the form of bottles, tanks, large hollow articles, rigid food containers and toys, etc.

EXAMPLES

To provide a better understanding of the foregoing discussion, the following non-limiting examples are provided. Although the examples are directed to specific embodiments, they are not to be viewed as limiting the invention in any specific respect. All parts, proportions and percentages are by weight unless otherwise indicated.

Preparation of Spray Dried Catalyst System

The spray dried catalyst system for Examples 1-4 was prepared according to the following method. 754 lbs of fresh, sieved toluene, 491 lbs of a 10% solution of methylaluminoxane in toluene, and 69 lbs of Cabosil TS620 were added to a 270 gallon feed tank. The mixture was mixed for 1 hour at 40° C. After mixing 1,035 g of bis(1-propylcyclopentadienyl) hafnium dimethyl catalyst compound, having a molecular weight (MW) of 422.5 g, was then added to the mixture and mixed for 1 hour at 40° C. to produce a catalyst mixture. The catalyst mixture or suspension was then introduced to an atomizing device producing droplets that were contacted with a gas stream to evaporate the liquid, thereby forming a powder. The drying temperature was maintained at about 80° C. The resulting powder was determined to have an aluminum (Al) content of about 7 mmol Al/g catalyst and a Hafnium (Hf) content of about 0.045 mmol Hf/g catalyst, providing a Hf/Al ratio of about 155. The total amount of spray dried catalyst system recovered was about 114 lbs.

Preparation of the Catalyst Slurry

The catalyst slurry for Examples 1-4 was prepared according to the following method. 396 lbs of Hydrobrite 380 mineral oil, 55 lbs of Isopar C, and 106 lbs of the spray dried catalyst system were added to an in-line slurry vessel to produce the catalyst slurry. The catalyst slurry was mixed for 4 hours at 40° C. and then introduced to a 120 gallon horizontal cylinder.

Preparation of the Supported Catalyst System

The supported catalyst system for Comparative Examples C1-C3 was prepared according to the following method. The metallocene catalyst compound used for examples C1-C3 was also a bis(1-propylcyclopentadienyl)hafnium dimethyl catalyst compound. 846 g of a 30 wt % solution of MAO in toluene and additional toluene (dried and degassed) were introduced to a mixer at room temperature and slowly stirred. The metallocene catalyst compound (18.5 g) was dissolved in 100 ml of toluene and introduced to the mixer containing the MAO and toluene mixture. The stirring speed was increased to 130 rpm and continued for 1 hour at room temperature. A silica support (700 g), dehydrated at 875° C., was then introduced to the mixer and stirred for 1 hour at room temperature. After one hour drying was began by increasing the bath temperature to 85° C. and a vacuum was applied. Once the material was through the "mud stage," i.e. no free liquid is visible, a nitrogen gas purge at 10% on a rotometer was introduced to the mixer. During the mixing of the support, metallocene catalyst, and MAO, the temperature of the mixture was maintained at about 80° C. and mixed for about 2 hours. The mixture was then cooled down and stored in an oven-dried container under a nitrogen atmosphere.

Pilot Plant Gas Phase Fluidized Bed Polymerization Process

The polymerization reactions for Examples 1 and 2 and Comparative Examples C1 and C2 were conducted in a continuous pilot-scale gas phase fluidized bed reactor of 0.35 meters internal diameter and 2.3 meters in bed height. The fluidized bed was made up of polymer granules. The gaseous feed streams of ethylene and hydrogen together with liquid comonomer were introduced below the reactor bed into the recycle gas line. Hexene was used as the comonomer. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentrations of all the gases were measured by an on-line gas chromatograph to ensure relatively constant composition in the recycle gas stream.

For Examples 1 and 2 the spray dried catalyst system was mixed with a purified mineral oil (Hydrobrite 380) and an aliphatic/isoparaffinc hydrocarbon (ISOPAR C) and introduced into the pilot plant's catalyst slurry delivery system. The slurried mixture for both examples had a concentration of about 71 wt % mineral oil, about 10 wt % aliphatic/isoparaffinc hydrocarbon, and about 19 wt % spray dried catalyst system.

The catalyst slurry delivery system included a section of 0.125" tubing inside a length of 0.25" tubing. Small beads on the outside of the 0.125" tube weld ensure it is concentrically disposed within the 0.25" tube. The 0.125" tube typically projects about 0.25" beyond the 0.25" tube. The tip of the entire tube-in-tube assembly is located from about 3" to about 4" away from the inner wall of the reactor. The catalyst slurry is pressurized to slightly above reactor pressure using a positive displacement piston-type metering pump. The pump injects the pressurized slurry into a continuous two-phase stream of isopentane and nitrogen that is connected to the 0.125" inner tube of the catalyst injection assembly. Typical flow rates for the isopentane and nitrogen in the 0.125" tube are 3 lb/hr and 5 lb/hr respectively. These flow rates have been found to effectively atomize the catalyst slurry into a fine dispersion in the gas phase fluidized bed reactor. A two-phase mixture of nitrogen and isopentane is fed to the annular volume between the inner and outer tubes. The shear forces from this flow on the outside surface along the taped end of the 0.125" tube prevents agglomerates from forming on the tip of the 0.125" tube during polymerization.

For the silica supported metallocene compounds (supported catalyst system) in comparative examples C1 and C2, the polymerization was carried out the same as in Examples 1 and 2, but introduction of the supported catalyst system was carried out using a catalyst feeder. Typical catalyst feeders can meter dry catalyst semi-continuously and introduce the catalyst into the reactor using an inert gas such as nitrogen. The catalyst feeder can include a catalyst storage reservoir and a rotor with a brush that can force or urge dry catalyst through a screen and metering disk. The metering disk can have holes or recesses and as the disk rotates the holes or recesses can be filled with catalyst. By adjusting the speed of the rotor, the amount of catalyst introduced to the reactor can be measured.

The introduction rates of the catalyst slurry in Examples 1 and 2 and the introduction rates of the supported catalyst system in comparative examples C1 and C2 were adjusted to maintain a constant production rate of polymer. The reacting bed of growing polymer particles was maintained in a fluidized state by the continuous flow of the make up feed and recycle gas through the reaction zone. A superficial gas velocity of 0.6-0.9 m/s was used to achieve this. Other reactor conditions are shown in Table 1. The fluidized bed was maintained at a constant height by withdrawing a portion of the bed at a rate equal to the rate of formation of particulate product. The rate of product formation (the polymer production rate) was in the range of about 15 kg/hr to about 25 kg/hr. The product was removed semi-continuously via a series of valves into a fixed volume chamber. This product was purged to remove entrained hydrocarbons and treated with humidified nitrogen to deactivate any trace quantities of residual catalyst.

For Examples 1 and 2 and comparative examples C1 and C2 a continuity additive was also introduced to the reactor during polymerization. For Example 1 and comparative example C1 the continuity additive was CA1. CA1 comprised LUPASOL FG which is a low molecular weight (800 Daltons) ethylenimine copolymer available from BASF. For Example 2 and comparative example C2 the continuity additive was CA2. CA2 is a mixture of aluminum distearate and an ethoxylated amine type compound (IRGASTAT AS-990, available from Huntsman (formerly Ciba Specialty Chemicals)) that is slurried in mineral oil (Hydrobrite 380) to have total slurry concentration of approximately 20 wt %. The concentration of the continuity additive shown in Table 1 for each example is based on production rate of the polymer.

Polyethylene samples having similar densities and melt indices (I2) were prepared in Examples 1 and 2 and comparative examples C1 and C2. For examples 1 and 2, the reactor operated smoothly without any sheeting or fouling therein. Table 1 summarizes the polymerization results below.

TABLE 1

|  | Ex. 1 | C1 | Ex. 2 | C2 |
|---|---|---|---|---|
| Catalyst Type | Spray Dried | Silica Supported | Spray Dried | Silica Supported |
| Catalyst Delivery to reactor | Slurry | Dry | Slurry | Dry |
| C2 Partial Pressure (psia) | 220 | 220 | 220.33 | 219.72 |
| H2/C2 Ratio (ppm/m %) | 5.76 | 5.6 | 5.89 | 5.71 |
| C6/C2 Conc Ratio (m/m) | 0.0178 | 0.0163 | 0.0179 | 0.0162 |
| Reactor Pressure (psig) | 349.27 | 348.5 | 349.29 | 348.4 |
| Reaction Temperature (° C.) | 77 | 77 | 77 | 77 |
| Continuity Additive Name | CA1 | CA1 | CA2 | CA2 |
| Continuity Additive Concentration (ppmw) | 2.9 | 4.9 | 32.4 | 29.3 |
| Melt Index ($I_2$) | 0.754 | 0.846 | 29.3 | 32.4 |
| MFR ($I_{21}/I_2$) | 30.6 | 33.1 | 0.812 | 0.891 |
| Density (g/cm$^3$) | 0.9189 | 0.9185 | 0.9174 | 0.9175 |
| Catalyst Productivity, (gPE/g CatSys) | 17,660 | 13,083 | 14,109 | 11,267 |

Surprisingly and unexpectedly, the catalyst productivity for the slurried catalyst in Examples 1 and 2 exhibited greater catalyst productivity as compared to the silica supported catalyst delivered to the reactor as a dry powder. The slurried catalyst in Example 1 had a catalyst productivity of 17,660 gPE/g CatSys, while the comparative example only had a catalyst productivity of 13,083 gPE/g CatSys, which is about 26% less. Similarly, the slurried catalyst in Example 2 had a catalyst productivity of 14,109 gPE/g CatSys while the comparative example only had a catalyst productivity of 11,267 gPE/g CatSys, which is about 20% less. The catalyst productivity for all examples discussed herein was based on ICPES (inductively coupled plasma emission spectrometry) measurement of residual Hf.

Also, surprisingly and unexpectedly, introducing the spray dried catalyst system as a catalyst slurry with the continuity additive in Examples 1 and 2 produced the polymer products without the formation of agglomerates such as rubble, chunks, sheets, lumps, and the like.

Commercial Scale Gas Phase Fluidized Bed Polymerization Process

The polymerization for Examples 3 and 4 and comparative example C3 were carried out in a semi-commercial UNIPOL™ PE reactor with diameter of 2.4 meters and having a production rate of about 10,000 lb/hr to about 12,000 lb/hr. The catalyst slurry was injected to the reactor using a catalyst slurry delivery system having an effervescent nozzle that includes an inner 0.125" emulsion tube containing nitrogen gas. The effervescent nozzle rests inside another 0.25" inch injection tube that carries the catalyst slurry and isopentane in the annular space. Nitrogen from the 0.125" inch emulsion inner tube exits holes or orifices in the inner emulsion tube and flows into the outer catalyst slurry tube, creating foam that is then broken up as it exits the injection tube. The nitrogen emulsion tube is inserted into the outer injection tube such that the end of the emulsion tube is 3 inches from the tip of the outer tube. The inner emulsion tube and outer catalyst slurry tube arrangement is disposed within a support tube such that an annulus is formed between the outer catalyst slurry tube and the support tube through which the olefin feed, ethylene and a comonomer hexene is carried. This catalyst injection system is inserted into the reactor above the distribution plate.

For Examples 3 and 4 the spray dried catalyst system was mixed with a purified mineral oil (Hydrobrite 380) and an aliphatic/isoparaffnic hydrocarbon (ISOPAR C) and introduced into the reactor via the catalyst injection system. The slurried mixture for both examples had a concentration of about 71 wt % mineral oil, about 10 wt % Isopar, and about 19 wt % spray dried catalyst system.

For Examples 3 and 4 and comparative example C3, the continuity additive (CA2) was also introduced to the reactor during polymerization via a separate nozzle. The concentration of the continuity additive shown in Table 2 for each example is based on the production rate of the polymer. For Examples 3 and 4 the reactor operated smoothly without any sheeting or fouling therein. Table 2 summarizes the polymerization results below.

TABLE 2

|  | Ex. 3 | Ex. 4 | C3 |
|---|---|---|---|
| Conditions | HD PE | LD PE | LD PE |
| Catalyst Type | Spray Dried | Spray Dried | Silica Supported |
| Catalyst Delivery to the Reactor | Slurry | Slurry | Dry |
| C2 Partial Pressure (psia) | 220 | 220 | 219 |
| H2/C2 Ratio (ppm/mole %) | 10.5 | 5.35 | 4.2 |
| C6/C2 molar concentration Ratio (mole/mole) | 0.0017 | 0.0159 | 0.0158 |
| Reactor Pressure (psig) | 249 | 253 | 248 |
| Reaction Temperature (° C.) | 94.9 | 77.5 | 78.2 |
| Continuity Additive Name | CA2 | CA2 | CA2 |
| Continuity Additive Level, ppmw | 38 | 33 | 32.5 |
| Melt Index ($I_2$) | 34.5 | 0.94 | 0.83 |
| MFR ($I_{21}/I_2$) |  |  |  |
| Density (g/cm$^3$) | 0.9517 | 0.9169 | 0.9183 |
| Catalyst Productivity, (gPE/g CatSys) | 16,808 | 16,835 | 10,456 |

Surprisingly and unexpectedly, introducing the spray dried catalyst system as a catalyst slurry in Examples 3 and 4 yielded a greater catalyst productivity as compared to the silica supported catalyst (C3) delivered to the reactor as a dry powder. The slurried catalyst in Example 3 had a catalyst productivity of 16,808 gPE/g CatSys and the slurried catalyst in Example 4 had a catalyst productivity of 16,835 gPE/g CatSys. The comparative example only had a catalyst productivity of 10,456 gPE/g CatSys, which is about 38% less than both Examples 3 and 4. The catalyst productivity for Examples 3 and 4 and comparative example C3 was based on the material balance.

Also, surprisingly and unexpectedly, introducing the spray dried catalyst system as a catalyst slurry with the continuity additive in Examples 3 and 4 produced the polymer products without the formation or generation of agglomerates such as rubble, lumps, sheets, chunks, and the like.

All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A method for gas phase olefin polymerization, comprising:
    combining a spray dried catalyst system with a diluent to produce a catalyst slurry;
    introducing ethylene, a continuity additive, and the catalyst slurry to a gas phase fluidized bed reactor, wherein the continuity additive is present in an amount ranging from about 1 ppmw to about 50 ppmw, based on a rate of polyethylene production;
    operating the reactor at conditions sufficient to produce a polyethylene, wherein the spray dried catalyst system has a catalyst productivity of at least 12,000 grams polyethylene per gram of the catalyst system,
    wherein the spray dried catalyst system comprises a metallocene compound which has the formula:

$Cp^A Cp^B M x_n$, wherein M is hafnium; $Cp^A$ and $Cp^B$ are each bound to M and are independently selected from the group consisting of cyclopentadienyl ligands, substituted cyclopentadienyl ligands, ligands isolobal to cyclopentadienyl and substituted ligands isolobal to cyclopentadienyl; X is a leaving group selected from the group consisting of chloride ions, bromide ions, $C_1$ to $C_{10}$ alkyls, and $C_2$ to $C_{12}$ alkenyls, carboxylates, acetylacetonates, and alkoxides; and n is an integer from 1 to 3.

2. The method of claim 1, wherein the spray dried catalyst system is formed by:
    combining a metallocene catalyst compound, an activator, a filler material, and a first diluent to produce a suspension;
    spray drying the suspension to produce a spray dried catalyst system.

3. The method of claim 2, wherein the activator comprises methylaluminoxane, modified methylaluminoxane, or a combination thereof.

4. The method of claim 2, wherein the filler material comprises fumed silica.

5. The method of claim 1, wherein the spray dried catalyst system consists essentially of the metallocene catalyst compound, an activator, and a filler material.

6. The method of claim 1, wherein the continuity additive comprises a mixture of aluminum distearate and an ethoxylated stearyl amine.

7. The method of claim 1, wherein the diluent comprises one or more mineral oils, one or more aliphatic hydrocarbons, or a combination thereof.

8. The method of claim 1, wherein the catalyst slurry comprises from about 75 wt % to about 90 wt % of the diluent and from about 10 wt % to about 25 wt % of the spray dried catalyst system.

9. The method of claim 1, wherein the diluent comprises a mixture of one or more mineral oils and one or more aliphatic hydrocarbons, and wherein a ratio of the one or more mineral oils to the one or more aliphatic hydrocarbons ranges from about 5:1 to about 10:1.

10. The method of claim 1, wherein the gas phase fluidized bed reactor is operated at a temperature of from about 75° C. to about 105° C. and a pressure of from about 1,600 kPa to about 1,850 kPa.

11. The method of claim 1, wherein the catalyst system has an activity of at least about 14,000 grams polyethylene per gram of the catalyst system per hour.

12. The method of claim 1, wherein the catalyst system has an activity of at least about 16,000 grams polyethylene per gram of the catalyst system per hour.

13. The method of claim 1, wherein the polyethylene is produced at a rate of at least 4,500 kg/hr.

14. The method of claim 1, wherein the polymerization is carried out on a continuous basis.

15. The method of claim 1, wherein no detectable generation of agglomerates is formed within the reactor during polymerization.

16. The method of claim 1, further comprising introducing at least one comonomer comprising one or more $C_4$ to $C_8$ alpha olefins to the gas phase fluidized reactor.

* * * * *